(12) United States Patent
Black

(10) Patent No.: US 6,967,656 B2
(45) Date of Patent: Nov. 22, 2005

(54) GROWING DEGREE UNIT METER AND METHOD

(75) Inventor: Marvin Allan Black, Plymouth, MN (US)

(73) Assignee: Syngenta Participations AG, Basel (CH)

( * ) Notice: Subject to any disclaimer, the term of this patent is extended or adjusted under 35 U.S.C. 154(b) by 251 days.

(21) Appl. No.: 10/281,748

(22) Filed: Oct. 28, 2002

(65) Prior Publication Data

US 2004/0080508 A1    Apr. 29, 2004

(51) Int. Cl.$^7$ ............................................. G06T 11/00
(52) U.S. Cl. ...................... 345/467; 345/440; 345/469; 345/470
(58) Field of Search ............................. 345/440, 467, 345/469, 470

(56) References Cited

U.S. PATENT DOCUMENTS 6,013,861 A  *  1/2000  Bird et al. ................... 800/284
6,476,299 B1 * 11/2002  Hotchkiss ................. 800/320.1

OTHER PUBLICATIONS

Pope, R., Degree Day Information for Iowa [online], Aug. 14, 2002 [retrieved on Sep. 24, 2002]. Retrieved from the Internet:<URL: http://www.ipm.iastate.edu/ipm/degreeday/>.
Pope, R., Degree days and crop management. Integrated Crop Management. [online], Apr. 6, 1998 [retrieved Sep. 24, 2002]. Retrieved from the Internet:<URL: http://www.ent.iastate.edu/ipm/icm/1998/4-6-1998/dd.html>.
Bontrager, O., Growing Degree Units and Relative Maturity Days. [online], May, 2001 [retrieved on Jun. 7, 2002]. Retrieved from the Internet:<URL: http://www.staufferseeds.com/0603aq0105.htm>.
Nafziger, E., Wet Again: Corn Planting Delays. Cooperative Extension Service, University of Illinois at Urbana-Champaign. [online], No. 7/May 8, 1998 [retrieved on Jun. 27, 2002]. Retrieved from the Internet:<URL: http//www.ag.uiuc.edu/cespubs/pest/articles/v987j.html>.
Accu-Trax, [online], [retrieved Aug. 12, 2002]. Retrieved from the Sensatronics online Product Catalogue. <URL: http://sensatronics.com/AccuTrax/>.

* cited by examiner

*Primary Examiner*—Matthew C. Bella
*Assistant Examiner*—Tam Tran
(74) *Attorney, Agent, or Firm*—Bruce Vrana

(57) ABSTRACT

A method for determining the growing degree units (GDUs) accumulated at a particular farm site throughout the growing season, the amount that such accumulation is above or below the average historical GDU accumulation that occurred at the farm site, and a GDU meter for obtaining and displaying such information. The GDU meter measures and stores the temperatures that occur at a farm site throughout every 24-hour period of the growing season and calculates and stores the accumulated GDUs that impinge on the site year to date. The GDU meter compares the GDUs accumulated year to date (year to date GDUs) to the average GDUs accumulated in previous years at the same site (historical GDUs) and calculates how much the year to date GDUs are above or below the historical GDUs. The GDU meter of the present invention displays year to date GDUs and the amount that it is above or below the historical GDUs. Optionally, the GDU meter of the present invention displays the date, time, and temperature. The GDU meter may be connected to the Internet for transfer of the GDU data contained in the GDU meter to a website accessible to the farmer.

14 Claims, 5 Drawing Sheets

GROWING DEGREE UNIT METER AND METHOD

FIELD OF THE INVENTION

The present invention relates to a method for determining the growing degree units that have accumulated at a particular farm site throughout the growing season, the amount that such accumulation is above or below the average historical accumulated GDUs that occurred at the farm site during previous growing seasons, and a meter for obtaining and displaying such information.

BACKGROUND OF THE INVENTION

Physiological development in plants is impacted by environmental conditions, with moisture and heat being of primary importance. Economically important crops such as corn and soybeans are categorized and evaluated on the basis of the amount of heat required to reach various development stages. For example, a specific corn hybrid requires a certain amount of heat to emerge, flower and reach physiological maturity (black layer). A different hybrid may require more or less heat for similar development. The warmer the average temperature, up to a maximum, the faster corn grows. The amount of heat accumulated during the growing season is measured as "growing degree units" (GDUs).

Growing degree units are used in the industry to describe and predict stages of corn growth from planting to harvest. It is also a common practice in the industry to develop various GDU requirements for particular hybrid products. The majority of all seed companies use GDUs as part of their product description and the GDU calculation set forth below is an industry standard. These GDU ratings are used by seed professionals and growers to select their product portfolio, and are used to assist growers to spread their production risks. For example, selecting hybrids with different flowering/silking GDU requirements will offer some protection during an unexpected midsummer period of high heat. GDUs are also used in seed production to determine inbred split planting times. Weeds and insect pest cycles are also impacted by GDUs.

Knowing how much heat has accumulated on a daily basis helps growers monitor their crop development and make management decisions that optimize crop performance. Traditionally, farmers obtain accumulated GDU data calculated from temperature readings taken at a site located in a region where the farmers' fields or growing sites are located and compare the GDU data to the historical GDU data for that region. Farmers obtain the GDUs accumulated year to date for a particular region from the local newspaper, television, and/or radio. Typically, this information includes whether the accumulated GDUs are ahead or behind a "normal" year for region in which the farm site is located. A farmer may use this regional information to determine crop management strategies at his particular fields for that particular growing season. In the U.S. Midwest, accumulation of GDUs typically begins on April $1^{st}$ and ends on October $1^{st}$.

The GDU data available to the farmer from public sources are likely calculated based on a start date that is different from the date farmers plant their fields. A farmer located in the northern portion of a region may experience significantly more rain than farmers located in the southern portion, causing that farmer to delay planting by two weeks compared to his or her southern counterparts. Thus, the GDU data available from the newspaper, radio, etc. in many cases will not accurately reflect the GDUs that actually impinge on a farmer's particular field.

Furthermore, regardless of the differences between data collection start dates, GDUs vary significantly within a county or region and among different farm sites in a region. Thus, the GDU data available from the newspaper, radio, etc. will not likely reflect the GDU accumulation at a farmer's local site. Variations in GDU accumulation can have a significant effect on crop performance and, therefore, crop management strategies. Inaccurate GDU data may lead the farmer to apply incorrect or sub-optimum crop management strategies.

Therefore, there is a need to take temperature readings at a farmer's field, accurately calculate the actual accumulated GDUs that impinge on a farmer's crops, and to compare current accumulated growing season GDUs at the particular site with historical data from the same site. There is also a need to provide a small, reliable and inexpensive GDU meter for placement in or adjacent to a farm site for this purpose. There is a further need to provide accurate crop management strategies to the farmer based upon the amount of GDUs accumulated at a particular site.

SUMMARY OF THE INVENTION

It is one object of the present invention to provide a GDU meter for placement at a farm site. The GDU of the present invention measures and stores the temperatures that occur at a farm site throughout every 24-hour period of the growing season and calculates and stores the accumulated GDUs that impinge on the site year to date.

According to the present invention, the GDU meter positioned on or adjacent a particular farm site compares the GDUs accumulated year to date (year to date GDUs) to the average GDUs accumulated in previous years at the same farm site (historical GDUs) and calculates how much the year to date GDUs are above or below the historical GDUs. The GDU meter of the present invention displays year to date GDUs and the amount that it is above or below the historical GDUs. Optionally, the GDU meter of the present invention displays the date, time, and temperature.

A further aspect of the invention includes linking the GDU meter of the invention to the Internet to display the GDU information on a website accessible to the farmer or business to which the information pertains. Yet another aspect of the invention is to provide a method for providing access to the website to a third party agricultural service provider, wherein the service provider can use the information to recommend timely and site specific crop management strategies to the farmer or business.

DETAILED DESCRIPTION OF THE INVENTION

Figure 1:
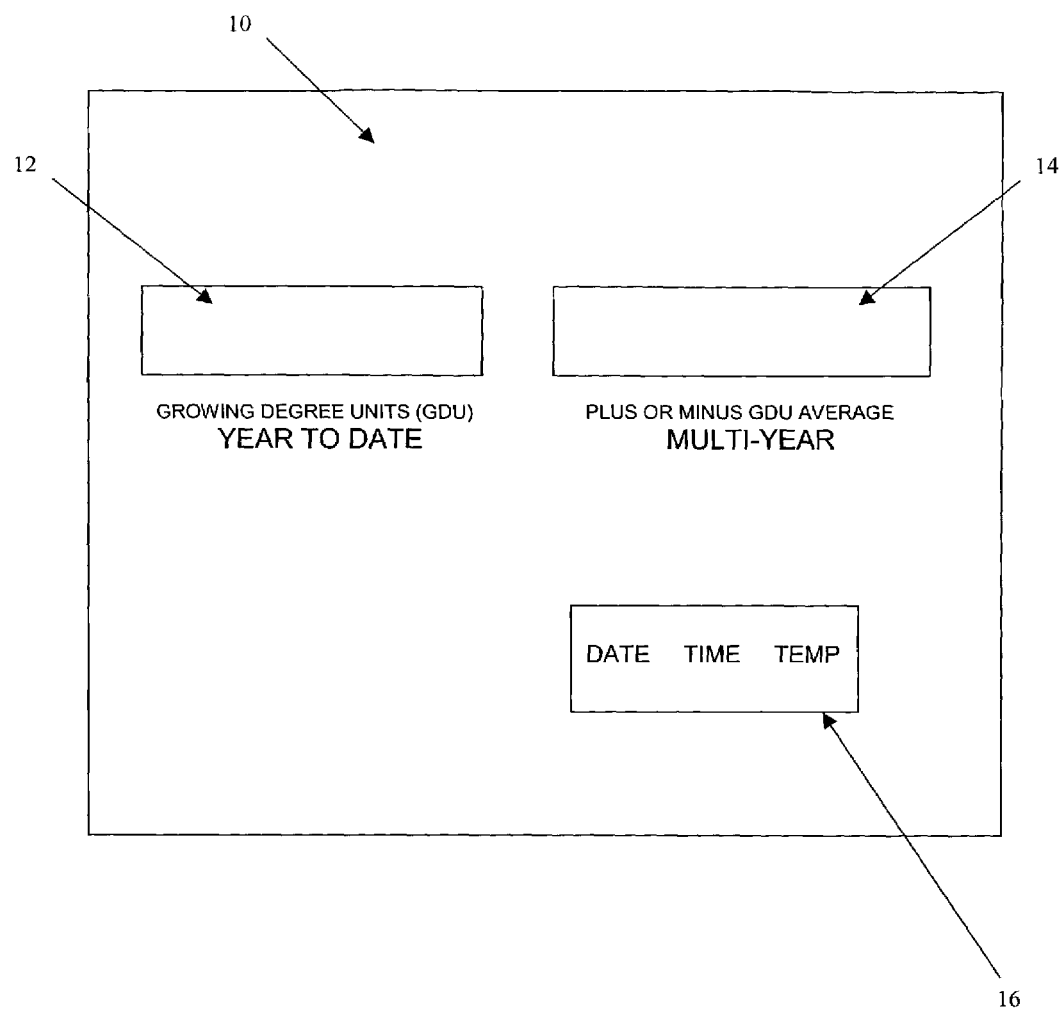
FIG. 1 shows a front view of the GDU meter 10 of the present invention

FIG. 1 shows a front view of one embodiment of the GDU meter 10 of the present invention. The GDU meter includes a housing having a display face with display window 12 that indicates the year to date GDUs that have occurred at a particular farm site. Display window 14 indicates the difference between year to date and historical data for the farm site. GDU meter 10 may also include display window 16 that indicates the date, time, and temperature.

Figure 2:
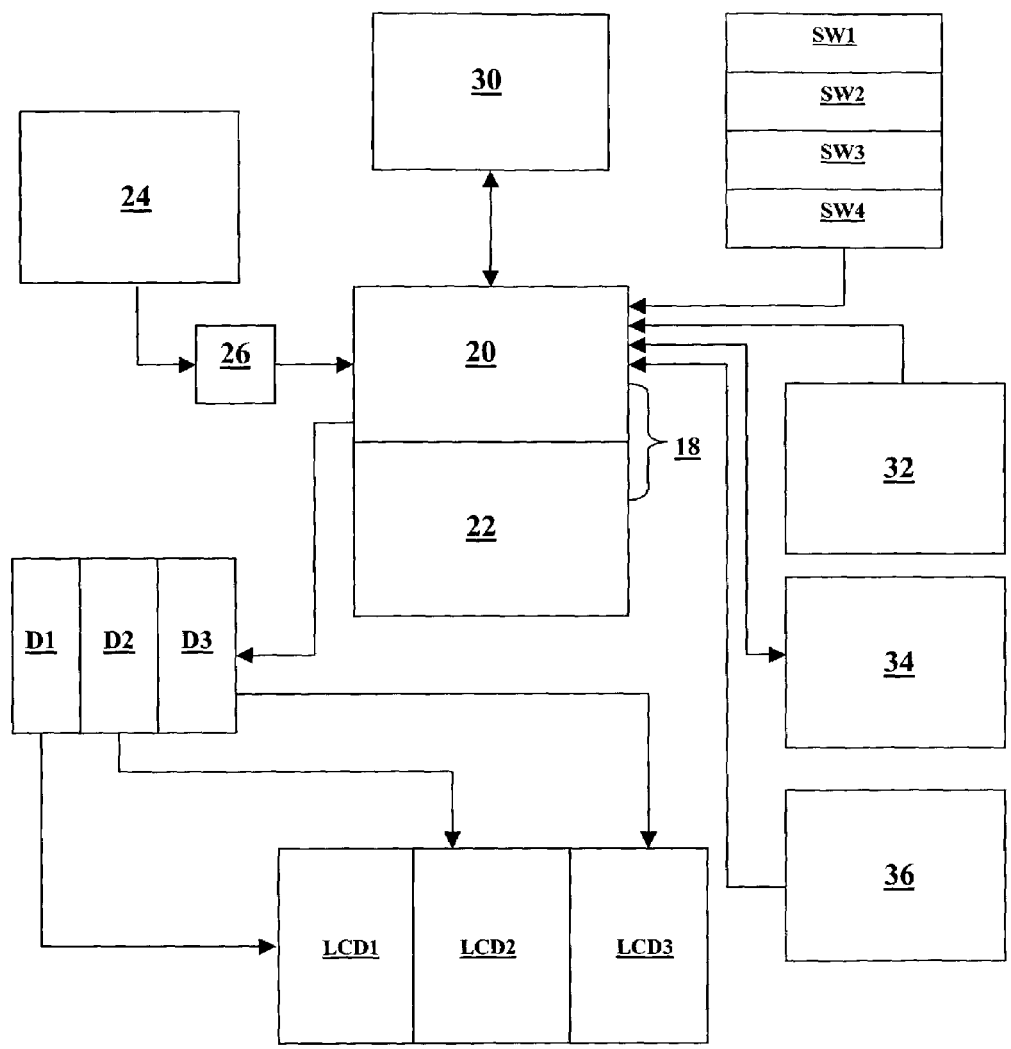
FIG. 2 is a block diagram showing the primary components of the GDU meter of the invention and the relationship therebetween.

The primary components of one embodiment of the GDU meter of the invention are shown in block diagram FIG. 2. Microcontrollers are integrated chips that may include, but are certainly not limited to, a processor or CPU, RAM, some form of ROM, and I/O ports. Microcontrollers are designed for specific tasks and are simplified compared to a general purpose PC, for example. Engineering a microcontroller to implement a particular task is within the scope of those skilled in the arts. In the present invention, microcontroller 18 includes a CPU or processor 20 manufactured by Temic™, P/N T89C51RD2RL. Processor 20 makes the calculations necessary to carry out the present invention. Microcontroller 18 also includes a storage device 22 manufactured by Atmel™, P/N: AT45DB081B-RC. It is recognized that processor 20 and storage device 22 can be contained on the same or different electronic component, and that the invention is not limited by the physical structure or location of processor 20, storage device 22, or any other component of GDU meter 10, or the functional relationships therebetween.

Storage device 22 stores data and communicates with processor 20. A temperature sensor 24 is connected to stereo jack 26 manufactured by Cui Stack P/N: SJ3533N, which provides temperature readings every minute during each 24-hour period to processor 20 for subsequent storage. RS232 serial port 30 is connected to a general-purpose computer, which is used to program microcontroller 18 and test the entire unit. Various software programs known to persons skilled in the art are used to program microcontroller 12 and test the integrity of circuitry of the GDU meter of the invention.

Switch inputs SW1, SW2, SW3, and SW4 are functionally connected and provide input to processor 20. Standard switches are manufactured by C & K, P/N: KS11R22CBE and P/N:KS11R22CGE.

In one embodiment of the invention, microcontroller 18 provides output to liquid crystal display (LCD) drivers D1, D2, D3. LCD drivers are electrically connected to liquid crystal displays LCD1, LCD2, and LCD3. By way of example, driver D1 receives data from processor 20 and provides it as output to be displayed on a LCD1. Philips manufactures an LCD driver P/N: PCF8576CT that is used by the present invention.

LCD1 displays the year to date GDUs accumulated at the particular site and LCD2 displays the amount the year-to-date GDUs are above or below the historical GDUs. LCD3 displays the time, temperature, and the date. It is recognized that the number of displays may vary and can include a single display wherein the different data are displayed sequentially.

The GDU meter is electrically connected to an AC power supply 32, and includes a backup power supply 34. The GDU meter of the invention also includes a clock 36 connected to processor 20.

The date is programmed into storage device 22 or is input into storage device 22 by the user. The historical GDU data is stored in storage device 22, and is originally obtained from the GDU data recorded for the past one or more years for each county in the continental U.S. In one embodiment of the invention, the GDU meter stores in storage device 22 historical accumulated GDU data pertaining to or representative of a particular city, county, reporting district, or state in which the GDU meter of the invention will be used. A general geographic area such as city, county, reporting district, or state in which a particular farm site is located is referred to herein as a "region." Reporting districts are significantly larger in size than counties. For example, Iowa has nine reporting districts: northwest, northeast, west, central, east, west southwest, east southeast, southwest, southeast.

GDUs are calculated by taking the high temperature for the day, adding the low temperature for the day, dividing the sum by two and subtracting 50. GDUs are calculated only for temps between 50° Fahrenheit and 86° Fahrenheit. Thus, if the temperature is below 50° F. for the entire 24-hour period, the GDU accumulated for that period would be 0. For corn, the possible GDU accumulation is between 0 and 36 for a 24-hour period.

In practice of the invention, the year to date GDUs at a particular farm site are calculated by processor 20 and stored in storage device 22. Year-to-date GDUs refer to the GDUs that have accumulated between the date the farmer plants his field or fields and starts the data collection by the GDU meter as discussed below, and the day during the growing season that the accumulated GDUs are calculated. It is understood that the farmer may take one or more days to plant all of his or her fields. According to the method of the invention, the farmer sets the GDU meter to start taking data sometime during the planting period or obtain more than one GDU meter for placement of temperature sensor 24 at different planting sites to better reflect the GDUs that impinge on the different sites. Typically, however, a farmer would likely place the GDU meter of the invention at the homestead or office location located near the farmer's fields. The term "farm site" broadly refers to an area comprising an entire farming establishment and is not meant to be limited to the fields where crops are grown. By way of example only, the GDU may be used on farms sites encompassing just a few acres, but more preferably on large farm sites encompassing over 1500 acres and even on very large farm sites encompassing over 4000 acres.

According to one embodiment of the invention, at midnight each day processor 20 calculates the GDUs that have accumulated for the day (the current date) and adds that number to the previously calculated accumulated GDUs for the growing season to obtain the year to date GDUs. For the current date, the year-to-date GDUs are displayed on LCD1. The GDU meter of the invention also pulls from memory device 22 the GDUs accumulated as of the date that corresponds to the current date for each of the previous years or growing seasons for which accumulated GDUs are stored and calculates for those years an average historical GDU value, otherwise referred to herein as "historical accumulated GDUs". Processor 20 calculates the amount year to date GDUs are above or below the historical accumulated GDUs, and then displays this amount on LCD2.

According to another embodiment, the five-year historical data is stored as a total of GDUs for a particular week. The GDU meter 10 stores the daily accumulated GDUs for the current year or growing season. Processor 20 totals the accumulated GDUs for the previous years' data stored in storage device 22 and takes an average to get the average historical accumulated GDUs, totals the current year's accumulated GDUs, and compares the values to get the difference that the current year GDU accumulation is above or below the average historical accumulated GDUs. Where the current year's data includes a partial week, (for example, the season started on a Tuesday), the corresponding historical week is divided by 7 and multiplied by 5 prior to calculating the accumulated GDUs and doing the comparison. It is understood that storing and accessing the GDU data, and calculating the daily GDUs, historical accumulated GDUs, and year-to-date GDUs may be accomplished in a number of different ways, all being apparent to those ordinary persons skilled in the art.

According to the invention, when the total accumulated GDUs obtained by the GDU meter for a current growing season at a particular site is stored in storage device 22, the historical GDU data for the oldest year is deleted from memory or otherwise replaced with the total accumulated GDUs of the current growing season. If three years, for example, of historical GDU data from the county or reporting district is originally stored in storage device 22, it would take three years (or growing seasons) of recorded GDU data from a particular farm site for the storage device 22 to contain purely site specific historical GDU information.

In one embodiment of the invention, a phone jack (not shown) allows for the GDU meter of the invention to be linked to the Internet, wherein data from the GDU meter is downloaded to a website (not shown). The data from the website may be accessed by the farmer to which the data pertains and/or by a third party agricultural service provider. In one embodiment, the GDU information would be displayed on the website in much the same way the information is displayed on the GDU meter of the invention. Alternatively, the data is displayed by the website in a database format. In another embodiment of the invention, an agricultural service provider tracks the information contained on the website and contacts the farmer in person or by sending messages using the website, email, phone or other device to suggest or help shape crop management strategies based on the site-specific GDU information contained on the website.

Creation and maintenance of interactive websites for the purpose of storing, creating, organizing text, graphical images, audio and video information for interactive use by the general public or selected individuals with access to the internet is well known in the art. Pertinent references include, *The Internet Complete Reference*, by Harley Hahn and Rick Stout, McGraw Hill, 1994); *Construction of Accessible Websites*, Jim Thatcher et al., $1^{st}$ Ed. Glasshaus Publishing, (2002); *Database Management: Website Development Applications*, Greg Riccardi, Addison-Wesley Publishing (2002).

Figure 3:
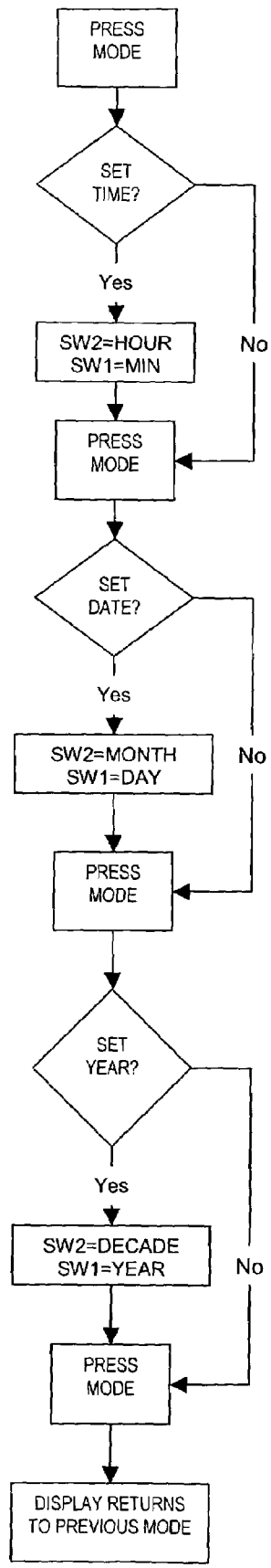
FIG. 3 is a flow diagram illustrating how to set the time, date, and year for the GDU meter of the invention.
Figure 4:
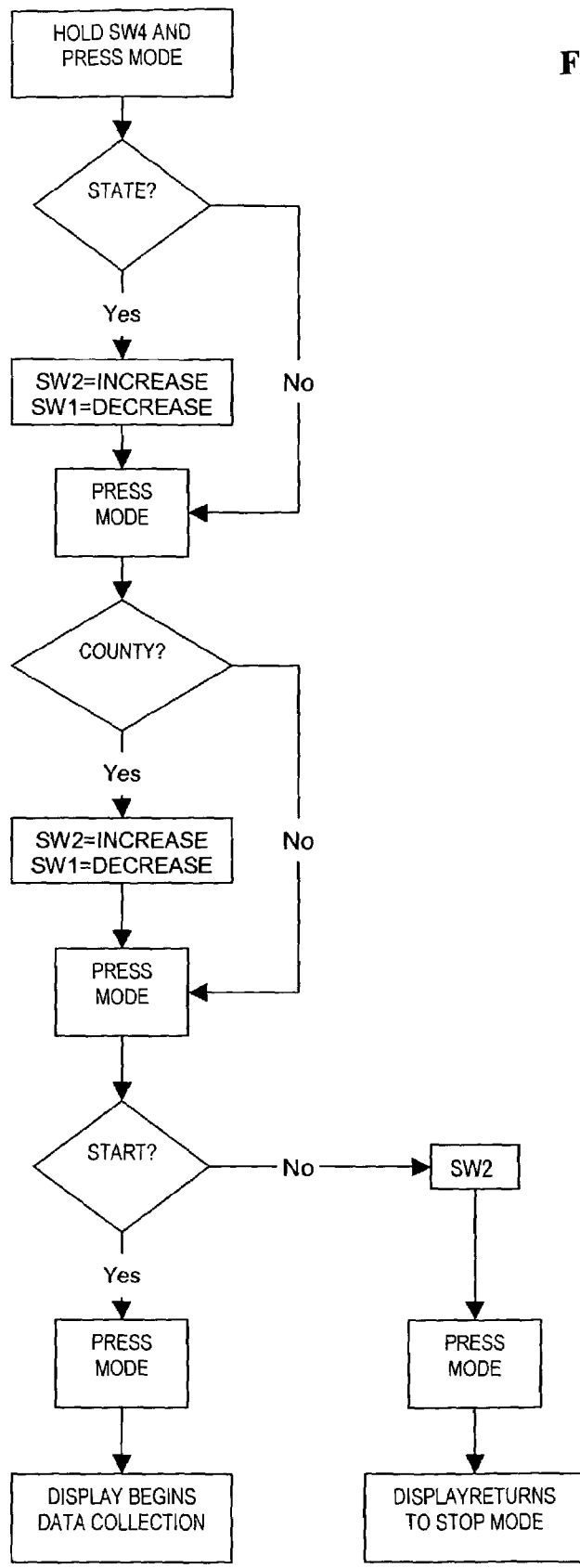
FIG. 4 is a flow diagram illustrating how to set the display of the GDU meter of the invention and start collecting data.
Figure 5:
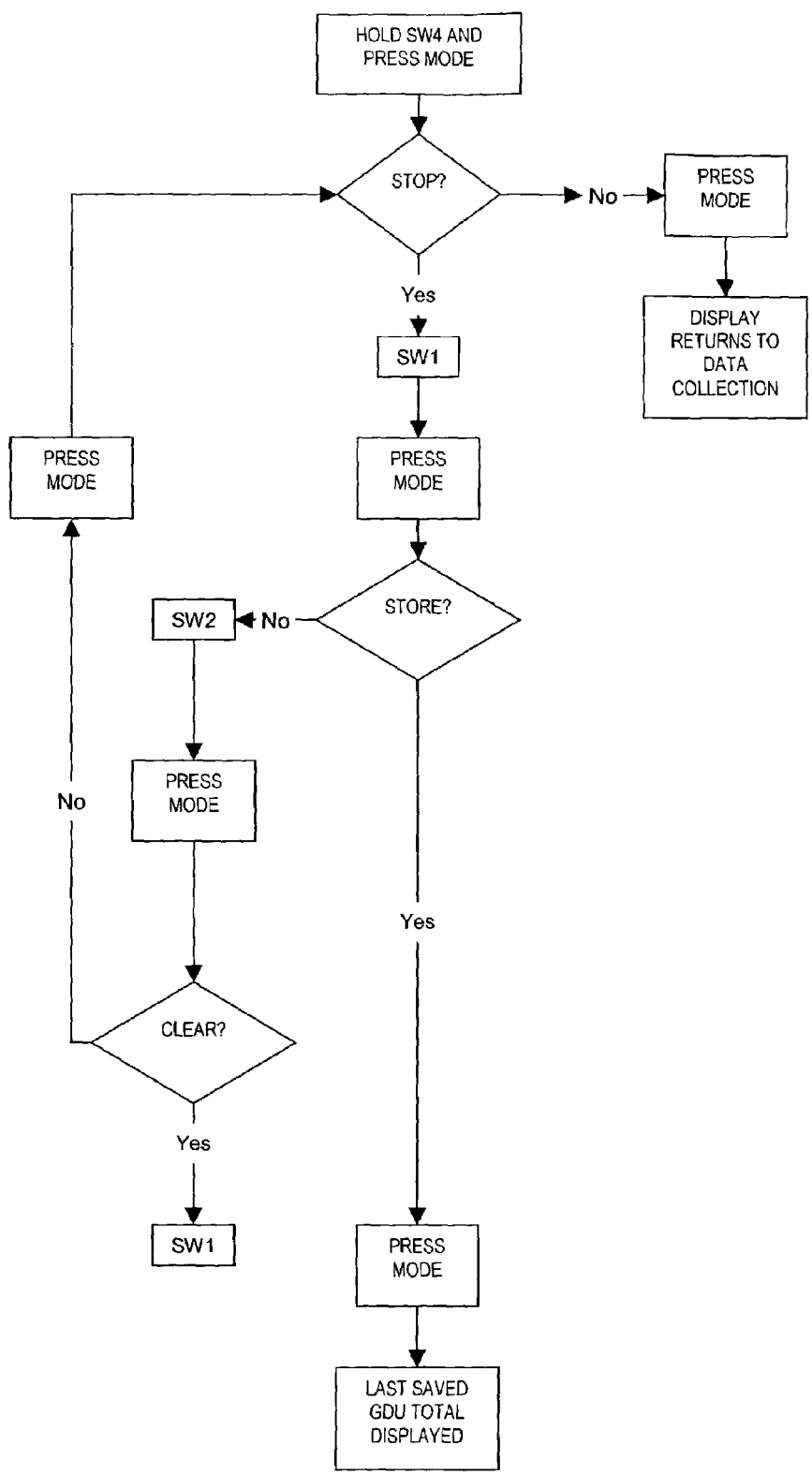
FIG. 5 is a flow diagram illustrating how to stop data collection and to store the data in the GDU meter of the invention.

Operation of the GDU meter of the invention is illustrated in FIGS. 3, 4, and 5. Temperature sensor 24 should be placed in a protected outdoor location to avoid direct exposure to sunlight and connected to display housing and the circuitry therein by a phone jack as stated above. For purposes of this description, temperature sensor 24 is considered as part of the GDU meter, although it may be located at a site remote from the GDU meter housing.

Referring to FIG. 3 and by way of example only, the time and year are set by pressing the mode button. The mode button is shown as switch SW3 on FIG. 2. Pressing the mode button makes the GDU meter available for inputting the time by using switch SW2 to select the hour and SW1 to select the correct minute. The mode button is again pushed to select the date, using switches SW2 and SW1 to select the correct month and day, respectively. The MODE button is pressed to display the year. Switches SW2 and SW1 are used to select the correct decade and year, respectively. When pressing the mode button yet again, the display returns to the previous mode.

Referring to FIG. 4 and by way of example only, to start collecting data the GDU meter of the invention must be instructed to access the correct city, county, reporting district, or state GDU information, which is originally stored in memory device 22 shown in FIG. 2. Switch SW4 and the mode button are pushed simultaneously, thereby displaying the field for selecting the correct State. Switches SW1 and SW2 scroll through the State listing contained in memory device 22. The mode button is pushed to select from the list of counties, for example. Switches SW1 and SW2 scroll through the counties listing contained in memory device 22. When pressing the mode button after selecting the county, the GDU device of the invention asks whether the user wants to start collecting data. If the answer is "yes," the user presses the mode button and the display begins to collect data. The GDU device of the invention will show 0 GDUs, the historical difference, if any, and the temperature, date, and time. If the answer is no, the user must press switch SW2 and then the mode button, wherein the display returns to the stop mode. During operation, the GDU meter of the invention loops the time, date, and temperature for display every 5 seconds.

FIG. 5 shows how to stop collecting data and to store the data according to one embodiment of the invention. A user of the invention would typically stop data collection on the date the crop associated with the GDU meter is harvested. To stop collection of data, switch SW4 and the mode button are pressed simultaneously, wherein the GDU meter displays "no" and "yes" options with regard to stopping data collection. Switch SW1 is pressed to display "yes," and the mode button is pressed to have the display show "store" and "yes." To store the accumulated data for the growing season in the 5-year historical database, the mode button is pressed. The display will then be in the stopped mode and display the annual GDU total and the historical difference.

If the user wants to stop collection and not store the data, the user would press the SW4 button and press the mode button simultaneously. The display will show "stop" and "no." Press switch SW1 to display "yes" and then press the mode button. The display will show "store" and "yes." Press SW2 to display "no" and then press the mode button. The display will then show "clear" and "no." To avoid clearing accumulated data, the user must press the mode button. The display will show "stop" and "no," at which point the user pressed the mode button to return to data collection. However, to stop data collection, press switch SW1 to display "yes" and then press the mode button. The GDU meter will be in the stopped mode and will show you the last saved annual GDU total and will show the historical difference. The GDU meter of the invention can be restarted by following the instructions pertaining to FIG. 4 as discussed above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A GDU meter for use at a farm site comprising:
   a) a processor;
   b) a storage device capable of receiving input from and providing output to said processor, wherein said storage device contains in storage data corresponding to historical accumulated GDUs for the region in which the farm site is located;

c) a temperature sensor residing outside at the farm site for providing temperature readings to said processor, wherein said processor calculates the growing degree units accumulated year to date and the number of growing degree units accumulated year to date above or below the average historical accumulated GDUs for said region; and d) a display indicating the number of growing degree units accumulated year to date at the farm site and the number of growing degree units accumulated year to date above or below the average historical accumulated GDUs at the farm site.

2. A GDU meter according to claim 1, wherein said display further indicates the current time, temperature and date.

3. A GDU meter according to claim 1, wherein said historical accumulated GDUs corresponding to the oldest year of data stored in said storage device is replaced with the total accumulated GDUs for the current growing season.

4. A GDU meter according to claim 1, wherein said storage device contains data representing the historical accumulated GDUs for the county where said farm site is located.

5. A GDU meter according to claim 1, wherein said storage device contains data representing the historical accumulated GDUs for the reporting district where said farm site is located.

6. A GDU meter according to claim 1, wherein said storage device contains at least one year of historical accumulated GDUs.

7. A GDU meter according to claim 1, wherein said meter is connected to an Internet website, wherein said website indicates:

i) the number of growing degree units accumulated year to date at said farm site;

ii) the number of growing degree units accumulated year to date above or below the average historical accumulated GDUs at said farm site.

8. A GDU meter according to claim 7, wherein said storage device contains at least one year of historical accumulated GDUs.

9. A method of obtaining GDU data for a particular farm site comprising the steps of:

a) placing a GDU meter at a farm site;

b) incorporating into said GDU meter data corresponding to historical accumulated GDUs for the region in which the farm site is located;

c) turning on the GDU meter at the time a farmer plants on said farm site, wherein said GDU meter calculates the number of growing degree units accumulated year to date at said farm site and the number of growing degree units accumulated year to date above or below the average historical accumulated GDUs for the region in which the farm site is located; and d) displaying the number of growing degree units accumulated year to date at said farm site and the number of growing degree units accumulated year to date above or below the average historical accumulated GDUs at said farm site.

10. A method of obtaining GDU data according to claim 9 further comprising the step of using the data collected by said GDU meter to help shape crop management strategies.

11. A method of obtaining GDU data according to claim 9 further comprising the step of connecting said GDU meter to an Internet website.

12. A method of obtaining GDU data according to claim 9 further comprising the steps of:

a) connecting said GDU meter to the Internet, wherein the GDU data from the GDU meter is transferred to a website;

b) providing a third party agricultural service provider access to said website, wherein said service provider is capable of tracking throughout the growing season the accumulated GDU at the particular farm site; and c) providing said farmer with crop management strategies based on the data transferred to said website from said GDU meter.

13. A method of obtaining GDU data according to claim 12, wherein said crop management strategies are provided to said farmer by indicating said strategies on said website.

14. A method of obtaining GDU data according to claim 9, wherein the data corresponding to the historical accumulated GDUs is data obtained from the farm site.

* * * * *